United States Patent [11] 3,602,751

[72] Inventors William C. Brenner
81 Chapel Ridge Place, Pittsburgh, Pa.
15238; John A. Tegopoulos, 8 Ilidos St.,
Athens 608, Greece
[21] Appl. No. 19,655
[22] Filed Mar. 16, 1970
[45] Patented Aug. 31, 1971
[73] Assignee Westinghouse Electric Corporation
Pittsburgh, Pa.

[54] TRANSPOSED CONDUCTOR FOR
DYNAMOELECTRIC MACHINES
7 Claims, 9 Drawing Figs.
[52] U.S. Cl..................................................... 310/102,
310/213
[51] Int. Cl....................................................... H02k 3/14
[50] Field of Search.......................................... 310/213,
201

[56] References Cited
UNITED STATES PATENTS
2,821,641 1/1958 Ringland...................... 310/213
FOREIGN PATENTS
960,980 6/1964 Great Britain................ 310/213
Primary Examiner—D. X. Sliney
Attorneys—A. T. Stratton and F. P. Lyle ABSTRACT: A transposed stranded conductor bar for dynamoelectric machines in which the conductor is completely transposed in a theoretically perfect manner to cancel out all induced strand voltages and to eliminate any circulating currents between strands. This is done by transposing the strands through 540° in the slot portion of the conductor and through 180° in both end portions of the conductor but with the transposition in opposite senses in the two end portions so that at any axial position in one end portion the strands are completely inverted in relative position with respect to the strands in the corresponding axial position in the other end portion.

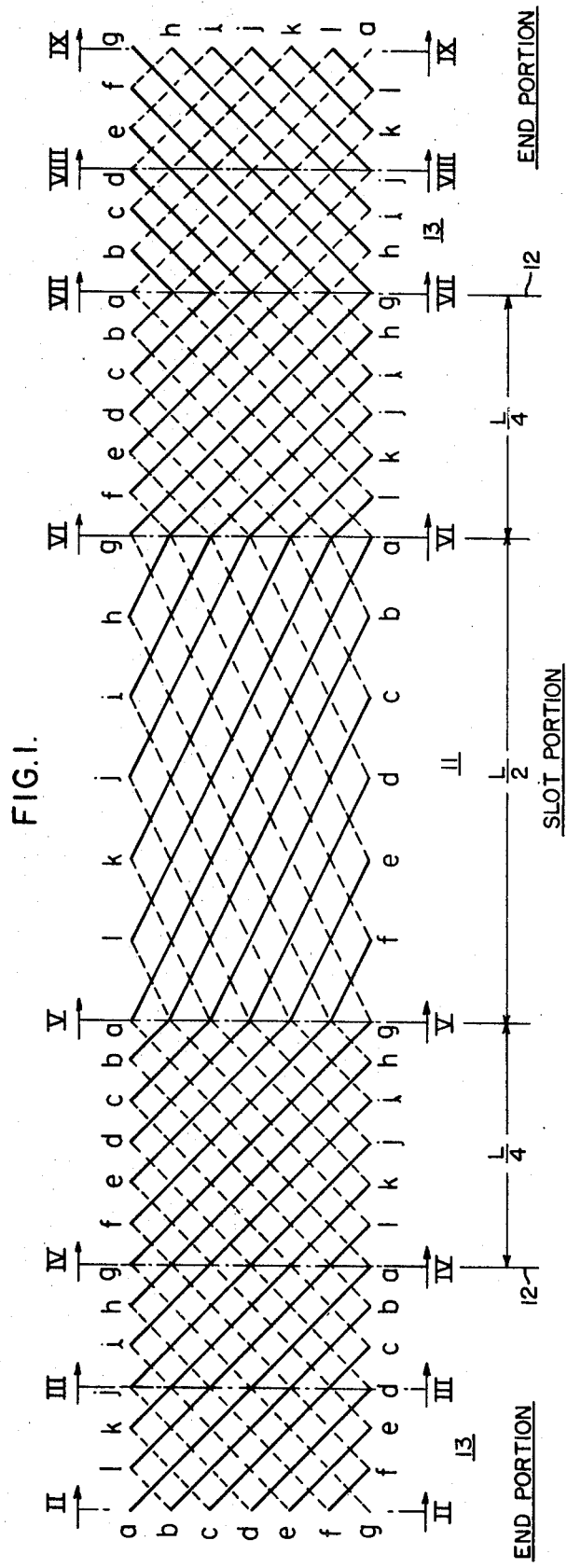
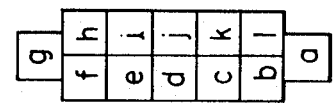
FIG.9.
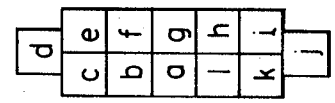
FIG.8.
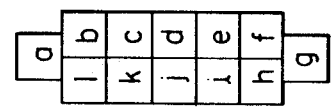
FIG.7.
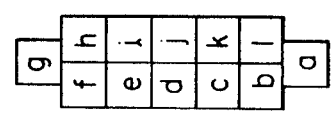
FIG.6.
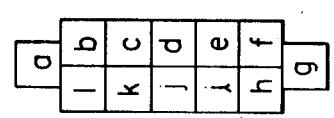
FIG.5.
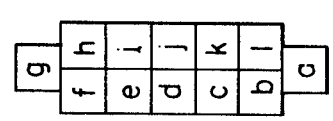
FIG.4.
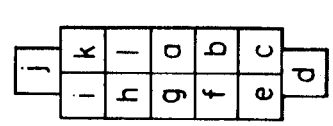
FIG.3.
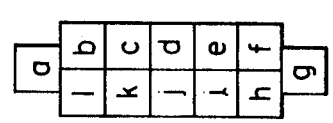
FIG.2.

TRANSPOSED CONDUCTOR FOR DYNAMOELECTRIC MACHINES

BACKGROUND OF THE INVENTION

The present invention relates to a conductor for dynamoelectric machines and, more particularly, to a transposed stranded conductor bar or half coil for machines of large size such as turbine generators.

The winding conductors of dynamoelectric machines are placed in slots in a laminated magnetic core. When currents flow in the conductors, magnetic fluxes occur across the slots which cause induced voltages and eddy currents in the conductor. Similar fluxes link the end turn portions of the conductor outside the slot, with some additional leakage flux from the rotor, and cause similar induced voltages in the end portions. For this reason, the conductors of large machines are always of stranded construction, being built up of a substantial number of relatively thin strands to minimize the eddy current loss. The fluxes, however, are not uniform but vary radially in density so that the induced strand voltages vary from strand to strand, and circulating currents due to these unbalanced voltages flow between the strands causing excessive losses and heating. For this reason, it is necessary to transpose the strands in order to cancel out as far as possible the unbalanced strand voltages to minimize the circulating currents and resultant heating.

The most commonly used type of transposition which has been in general use for many years is the so-called Roebel transposition. In this arrangement, as shown in U.S. Pat. No. 1,144,252, to Roebel the strands are disposed in two side-by-side stacks and are transposed within the slot by crossovers or cranks between the stacks. In each stack, the strands are inclined so that each strand moves vertically to the top or bottom of the stack, crosses over to the other stack, moves vertically through the other stack and crosses over back to the first stack. Thus, looking at the end of the conductor, each strand moves through an angle of 360° in going from one end of the slot to the other and emerges at the other end in the same relative position at which it entered the slot. Since the spacing between crossovers, or the cranking distance, is uniform throughout the length of the slot, each strand occupies all positions in the slot for equal distances and the induced strand voltages exactly balance out so that the transposition is completely balanced within the slot. The transposition within the slot, however, does not affect the induced voltages in the end portions of the conductor outside the slot which would cause circulating currents and excessive heating. In the usual practice, this has been overcome by dividing the strands into groups in the end portions and transposing the groups at the connections between adjacent conductors which form a complete coil. In this way, the strand voltages in the end portions can be balanced out in a complete coil or group of coils.

The Roebel transposition with group transpositions in the end portions is entirely satisfactory where the strands are insulated from each other throughout a complete coil or group of coils. In some cases, however, it is necessary or desirable to join the strands together at each end of each conductor bar or half coil. In very large turbine generators, for example, where a liquid coolant such as water is circulated through hollow strands in the conductor, it is impractical because of manufacturing difficulties to provide an individual water connection for each strand and a common water header or connector is used at each end of the half coil to supply water to all the strands of the conductor. This necessarily shorts the strands together at each end so that they are all electrically in parallel within the conductor and group transpositions are not possible. With the strands thus shorted together at each end, the conventional Roebel transposition still results in balanced voltages within the slot but the unbalanced strand voltages in the end portions of the conductor result in large circulating currents and excessive heating which is too great to be tolerated.

One scheme for cancelling the unbalanced voltages in the end portions has been proposed in U.S. Pat. No. 2,821,641 to Ringland. In this scheme the end portions of the conductor at opposite ends are inverted with respect to each other. This is done by transposing the strands within the slot through 180° in the first quarter of the slot length, through 180° in the second and third quarters of the slot length, and through another 180° in the last quarter of the slot, making a total transposition of 540° within the slot. The end portions are thus inverted with respect to each other, and with twice the crossover spacing in the center half of the slot length as compared to the spacing in the first and fourth quarters, the arrangement is such that each strand still occupies all positions in the slot for equal distances and a completely balanced transposition within the slot is obtained. The inversion of the end portions with respect to each other tends to approximately balance the strand voltages in the end portions, and if they were the same at opposite ends, the strands could then be shorted together at both ends if desired. The fluxes in the end regions at opposite ends of the machine may not always be the same, however, and the desired degree of cancellation cannot always be obtained. A modification of this type of transposition has therefore been suggested in U.S. Pat. No. 3,118,015 to Willyoung in which the strands are transposed within the slot through some angle between 360° and 540°, so that the end portions are only partially inverted with respect to each other and any differences in the end region fluxes and in the induced strand voltages at opposite ends can be compensated for. The spacing of the crossovers in the slot portion is adjusted so that a balanced transposition is obtained within the slot and, with proper design, approximate cancellation of the strand voltages may be obtained.

There is, however, another problem which is not materially helped by these arrangements. Since the induced voltages in the end portions are only approximately balanced, some residual eddy currents or circulating currents will occur in the strands, and as the end portions of the conductor are not transposed these residual currents are not uniformly distributed. Thus, the top strands of the conductor carry much higher currents than the strands in the center of the conductor, which tend to have minimum current, while the strands at the bottom of the conductor carry currents of intermediate magnitude. Thus, even if the transposition is complete within the slot and the induced end portion voltages are approximately balanced so that circulating currents are effectively minimized, there is still a nonuniform current distribution between the strands and local overheating of the strands carrying the highest currents can occur.

SUMMARY OF THE INVENTION

It is the principal object of the present invention to provide an improved transposed stranded conductor bar or half coil for dynamoelectric machines which is completely transposed in a theoretically perfect manner to effectively cancel all induced strand voltages, including the voltages induced in the end portions, so as to minimize eddy current losses and substantially eliminate all circulating currents.

As discussed above, prior approaches to this problem have involved the provision of complete transpositions within the slot portion of the conductor to obtain a completely balanced transposition within the slot, and various expedients, including group transpositions and complete or partial inversion of the end portions, have been used or proposed to approximately cancel the unbalanced induced strand voltages in the end portions. These prior arrangements have been successful where the strands are not shorted together at the ends of the conductor and where a considerable degree of nonuniformity in current distribution can be tolerated. Where shorting of the strands is necessary or desirable they are less satisfactory and can result in excessive localized overheating because of their failure to obtain uniform current distribution between the strands.

In accordance with the present invention, a conductor bar is provided which is completely transposed through 540° in the slot portion so that a balanced transposition is obtained within the slot and the end portions emerge from the slot completely inverted with respect to each other. The end portions of the conductor are also fully transposed throughout their lengths. In the preferred embodiment each end portion is transposed through 180° and the transpositions in the two end portions are made in opposite senses. In this way the strands in any axial position in one end portion of the conductor are inverted in position with respect to the strands in the corresponding axial position in the other end portion, and complete cancellation of the induced strand voltages is obtained. Since the conductor is continuously transposed from one end to the other in such a manner that in any axial position the strands are inverted with respect to another corresponding axial position, the transposition is theoretically perfect and complete cancellation of the unbalanced voltages and elimination of circulating currents can be obtained.

DESCRIPTION OF THE DRAWINGS

The invention will be more fully understood from the following detailed description, taken in connection with the accompanying drawings, in which:

FIG. 1 is a diagrammatic view in side elevation of a conductor bar or half coil embodying the invention; and FIGS. 2 through 9 are diagrammatic transverse sections on the lines II—II through IX—IX, respectively, of FIG. 1, showing the relative positions of the strands at various positions along the length of the conductor.

DESCRIPTION OF THE PREFERRED EMBODIMENT

There is shown in FIG. 1 a somewhat diagrammatic representation of a conductor bar or half coil 10 for use in a dynamoelectric machine such as a large turbine generator. The conductor 10 has a straight central slot portion 11 adapted to be received in the slot of a stator core. The slot portions 11 extends for a length L between the lines 12 which may be taken as representing the ends of a stator core. The conductor 10 also has end portions 13 at each end which are shown diagrammatically as extending straight out, although they may of course have any suitable configuration and are usually formed in a complex curve to extend circumferentially around the machine for connection to the end portion of another half coil lying in another slot.

The conductor 10 is a stranded conductor made up of a plurality of strands designated by the letters *a* through *l* and represented diagrammatically by single lines in FIG. 1 for clarity of illustration. The strands are arranged in the usual manner in two side-by-side stacks. Six strands have been shown in each stack for the purpose of illustration although it will be understood that a much larger number of strands would normally be used in an actual conductor. The solid lines in FIG. 1 represent the strands, or portions of strands, which lie in the front or near stack of strands of the conductor 10. The dotted lines represent the portions of strands lying in the rear stack. It will be understood that the strands are lightly insulated from each other, and that the conductor 10 is encased in a suitable insulating sheath to provide ground insulation for the conductor in the usual manner. Some or all of the strands may be made hollow for circulation of a liquid coolant, or other cooling means may be provided such as coolant ducts disposed between the stacks in known manner.

The strands of the conductor 10 are transposed in a manner which is generally similar to that of the usual Roebel transposition in that the transposition is made by crossovers between the stacks with the strands inclined to move upward or downward in the stack between crossovers. The manner in which the strands are actually transposed, however, is different from the conventional transpositions heretofore known. Starting at the left-hand end of FIG. 1, the strands are transposed throughout the length of the end portion 13 through an angle of 180° with uniform spacing of the crossovers. FIGS. 2 and 4 are diagrammatic transverse views at the outer end of the end portion and at the beginning of the slot portion, respectively. It will be seen that the strands change in position in a clockwise direction or sense, as viewed from the left of FIG. 1, through an angle of 180° so that they are inverted in position at opposite ends of the end portion 13.

The strands are transposed through a total angle of 540° in the slot portion 11 of the conductor 10. In the first quarter of the slot portion, the strands move in the clockwise sense through an angle of 180°, as shown by FIGS. 4 and 5. In the central half of the slot portion, that is, the second and third quarters of the slot length, the strands are transposed in the same sense through another 180°, as seen in FIGS. 5 an 6, and in the last quarter of the slot length the strands are transposed through a further 180° as seen in FIGS. 6 and 7. The spacing between crossovers in the second and third quarters of the slot length is made twice the crossover spacing in the first and fourth quarters as shown in FIG. 1, so that a balanced transposition within the slot portion 11 is obtained and the strands are inverted in position at opposite ends of the slot portion as can be seen by comparison of FIGS. 4 and 7.

In the second end portion 13, at the right of FIG. 1, the strands are again transposed through an angle of 180° through the entire length of the end portion with uniform crossover spacing, the crossover spacing in the two end portions 13 being the same. In the right-hand end portion, however, the direction or sense of transposition is reversed. That is, at the end of the slot portion the strands which were moving downward in the front stack are bent upward and move up in the end portion, as can be clearly seen in FIG. 1, while the strands in the rear stack are similarly reversed in direction. The strands in the right-hand end portion are thus transposed in the counterclockwise direction, as viewed from the left, as can clearly be seen by following the individual strands in FIGS. 7, 8 and 9.

The conductor 10 is thus fully transposed throughout its length through a total angle of 900°, that is, 180° in one end portion, 540° in the slot portion and another 180° in the other end portion, the transpositions in the two end portions being in opposite senses. In the slot portion the transposition is completely balanced with the strands inverted in relative position at opposite ends of the slot portion. The two end portions are also completely transposed since they are inverted in position and each is transposed through 180°, so that the voltages induced in the end portions are completely balanced out. Furthermore, the transpositions are in opposite senses in the two end portions which is an important feature of the invention. Because of this relation the strands in any axial position in one end portion are completely inverted in position with respect to the strands in the corresponding axial position in the other end portion. This may be seen by comparison of FIGS. 3 and 8 which are transverse views in corresponding axial positions in the two end portions and the complete inversion of the strands is readily apparent. The same relation exists in all other corresponding axial positions in the two end portions as will be clearly apparent from inspection of FIG. 1.

The effect of this arrangement is to provide a stranded conductor which is completely transposed in a theoretically perfect manner, since it is transposed throughout its entire length and each strand occupies all positions in the full length of the conductor for equal distances so that all induced voltages occurring in both the slot portion and the end portions are completely balanced out and cancelled.

The complete cancellation of all induced voltages results in greatly improved performance as compared to previously known transpositions. The conventional 540° transposition with untransposed end portions tends to approximately balance the induced voltages because of the inversion of the end portions, but it has a seriously nonuniform distribution of the residual eddy currents flowing in the conductor. This is because of the effect of the untransposed end portions which cause an edge crowding effect with the strands at the top and bottom of the conductor carrying greater currents than those in the center. This results in a rather large difference between the currents in different strands with resultant local overheating of the strands which carry the highest currents.

The complete transposition of the end portions of the conductor in accordance with the present invention eliminates this problem. The complete transposition effectively cancels out all unbalanced strand voltages and the opposite sense of transposition in the two end portions results in complete elimination of residual circulating currents and completely uniform current distribution. This result cannot be obtained by the previously known transpositions since merely inverting the end portions with respect to each other is not effective for this purpose. This is for the reason that although the flux densities at opposite ends of the machine may be the same they vary with the radius. Thus, the flux linking a particular strand pair at one end of the machine is not the same as the flux linking the same strand pair at the other end of the machine when the end portions have been inverted, since the strand pair is then in a different radial position at opposite ends. For this reason, inversion of the end portions does not solve the problem of nonuniform current distribution. In accordance with the present invention, however, the end portions are completely transposed and are not only inverted as a whole but because of the opposite senses of transposition the strand positions at each axial position of the two end turns are inverted, as previously explained. The effect of the varying flux density at different radial positions is therefore cancelled out and the current distribution is completely uniform as there are no residual circulating currents. Thus no localized overheating of particular strands can occur. This is an important advantage not heretofore obtainable with any of the known types of transposition and makes it possible to materially increase the rating of a machine in which the new transposed conductor is used by substantially eliminating eddy current losses, or at least reducing them to a negligible amount, and the conductor strands may be shorted together at the ends if desired without affecting the performance in any way.

A particular embodiment of the invention has been shown and described for the purpose of illustration but it will be apparent that other embodiments and modifications are possible. Thus, the reversal in sense of the transposition may be made at either end of the slot portion or even within the slot. Two or more 180° transposed sections might be used in each of the end portions, if desired, although difficulties might be encountered because of the required close spacing of the crossovers unless the end portions were unusually long. It is to be understood, therefore, that the invention is not limited to the specific illustrative embodiment shown and described but includes all equivalent modifications and embodiments.

We claim:

1. A conductor bar for a dynamoelectric machine having a straight central slot portion and two end portions, said conductor bar comprising a plurality of strands disposed in side-by-side stacks, said strands being transposed by crossovers from one stack to the other, the strands being completely transposed in the slot portion such that the strands are inverted in relative position at opposite ends of the slot portion, and the strands being further transposed through an angle of 180° in each end portion such that the strands at any position in one end portion are inverted in relative position with respect to the strands in the corresponding position in the other end portion.

2. A conductor bar as defined in claim 1 in which the strands are transposed through an angle of 540° in the slot portion.

3. A conductor bar as defined in claim 1 in which the strands are transposed through an angle of 180° in one end portion and through an angle of 180° in the opposite sense in the other end portion.

4. A conductor bar as defined in claim 1 in which the strands are transposed through an angle of 540° in the slot portion and through angles of 180° in opposite senses in the end portions.

5. A conductor bar for a dynamoelectric machine having a straight central slot portion and two end portions, said conductor bar comprising a plurality of strands disposed in side-by-side stacks, said strands being transposed by crossovers from one stack to the other, the strands being uniformly transposed through 180° in the first quarter of the slot portion, through 180° in the second and third quarters of the slot portion and through 180° in the fourth quarter of the slot portion, and the strands being transposed in the end portions such that the strands at any axial position in one end portion are inverted in relative position with respect to the strands in the corresponding axial position in the other end portion.

6. A conductor bar as defined in claim 5 in which the strands are transposed through 180° in opposite senses in each of the two end portions.

7. A conductor bar as defined in claim 5 in which the strands are transposed through 180° in one end portion in the same sense as the transposition in the slot portion and are transposed through 180° in the opposite sense in the other end portion.